United States Patent [19]

Maeda

[11] Patent Number: 4,709,594
[45] Date of Patent: Dec. 1, 1987

[54] PLANETARY GEAR TYPE TRANSMISSION SYSTEM

[75] Inventor: Fujio Maeda, Komatsu, Japan

[73] Assignee: Kabushiki Kaisha Komatsu Seisakusho, Tokyo, Japan

[21] Appl. No.: 815,594

[22] Filed: Jan. 2, 1986

[30] Foreign Application Priority Data

Jan. 14, 1985 [JP] Japan ................................ 60-3218

[51] Int. Cl.⁴ ............................................. F16H 3/44
[52] U.S. Cl. ........................................ 74/753; 74/740
[58] Field of Search ................... 74/740, 750 R, 753, 74/764, 765, 758, 761, 759, 760

[56] References Cited

U.S. PATENT DOCUMENTS

| | | | |
|---|---|---|---|
| 3,267,769 | 8/1966 | Tuck et al. | 74/759 |
| 3,319,492 | 5/1967 | Magnuson | 74/750 R |
| 3,815,445 | 6/1974 | Gorrell et al. | 74/740 |
| 4,070,927 | 1/1978 | Polak | 74/765 |
| 4,088,043 | 5/1978 | Johnson et al. | 74/765 X |
| 4,346,623 | 8/1982 | Tatsuo | 74/740 X |
| 4,531,428 | 7/1985 | Windish | 74/758 |
| 4,559,849 | 12/1985 | Ahlen et al. | 74/740 X |

FOREIGN PATENT DOCUMENTS 58-501048  6/1983  Japan .

Primary Examiner—Leslie Braun
Assistant Examiner—David Novais
Attorney, Agent, or Firm—Armstrong, Nikaido, Marmelstein & Kubovcik

[57] ABSTRACT

In a planetary gear type transmission system for seven forward speeds and one rearward speed, a high speed stage gear train is disposed on an input side of a low speed stage gear train, a low speed use rotary clutch in the low speed stage gear train is constructed so as to directly couple a ring gear in the high speed stage gear train with a carrier in the high speed stage gear train, a first speed stage gear train is disposed on an output side of a second speed stage gear train, a carrier in the first speed stage gear train is coupled to an output shaft, and a fourth speed stage gear train, a third speed stage gear train and a reverse stage gear train are disposed between the low speed stage gear train and the second speed stage gear train.

1 Claim, 7 Drawing Figures

PLANETARY GEAR TYPE TRANSMISSION SYSTEM

BACKGROUND OF THE INVENTION

1. Field of the Invention

The present invention relates to a planetary gear type transmission system for seven forward speeds and one rearward speed (making use of multiple clutch discs of wet type) that is available in a dump truck or the like.

2. Description of the Prior Art

Heretofore, as a planetary gear type transmission system for use in a middle-size dump truck, that for six forward speeds and one rearward speed as shown in FIG. 7 has been known. However, in recent years, it has become obvious that as a planetary gear type transmission system of such class, a transmission system for seven forward speeds and one rearward speed is most suitable in a ramp climbing property, an accelerating property and the like.

SUMMARY OF THE INVENTION

The present invention has been worked out in view of the above-mentioned situation in the prior art, and one object of the present invention is to provide a novel planetary gear type transmission system, in which upon actuation-ON of a low speed use rotary clutch in a low speed stage gear train, circulation of a torque is not present, a shaft stress can be made small, with regard to a stage ratio between speed stages, an equal stage ratio of about 1.35 which is close to an ideal value can be provided, and not only a high reliability associated with little torque and rotation change can be realized owing to an internal behavior, but also the system becomes compact.

According to the present invention, a planetary gear type transmission system is constructed in such manner that a high speed stage gear train H is disposed on an input side of a low speed stage gear train L, a low speed use rotary clutch 7 in the low speed stage gear train L is constructed so as to directly couple a ring gear 20 in the high speed stage gear train H with a carrier 13 in the high speed stage gear train H, a first speed stage gear train 1ST is disposed on an output side of a second speed stage gear train 2ND, and a fourth speed stage gear train 4TH, a third speed stage gear train 3RD and a reverse stage gear train R are disposed between the low speed stage gear train L and the second speed stage gear train 2ND, whereby a forward first speed F1 is realized by actuating ON the low speed use rotary clutch 7 in the low speed stage gear train L and actuating ON a rotary clutch in the first speed stage gear train 1ST, a forward second speed F2 is realized by actuating ON the low speed use rotary clutch 7 in the low speed stage gear train L and actuating ON a fixed clutch in the second speed stage gear train 2ND, a forward third speed F3 is realized by actuating ON a high speed use fixed clutch in the high speed stage gear train H and actuating ON a rotary clutch in the second speed stage gear train 2ND, a forward fourth speed F4 is realized by actuating ON the low speed use rotary clutch 7 in the low speed stage gear train L and actuating ON a fixed clutch in the third speed stage gear train 3RD, a forward fifth speed F5 is realized by actuating ON a high speed use rotary clutch in the high speed stage gear train H and actuating ON the fixed clutch in the third speed stage gear train 3RD, a forward sixth speed F6 is realized by actuating ON the low speed use rotary clutch 7 in the low speed stage gear train L and actuating ON a rotary clutch in the fourth speed stage gear train 4TH, a forward seventh speed F7 is realized by actuating ON a high speed use fixed clutch in the high speed stage gear train H and actuating ON the rotary clutch in the fourth speed stage gear train 4TH, and a rearward first speed R1 is realized by actuating ON the low speed use rotary clutch 7 in the low speed stage gear train L and actuating ON a reverse use rotary clutch in the reverse stage gear train R.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

BRIEF DESCRIPTION OF THE DRAWINGS

In the accompanying drawings

DESCRIPTION OF THE PREFERRED EMBODIMENT

Figure 1:
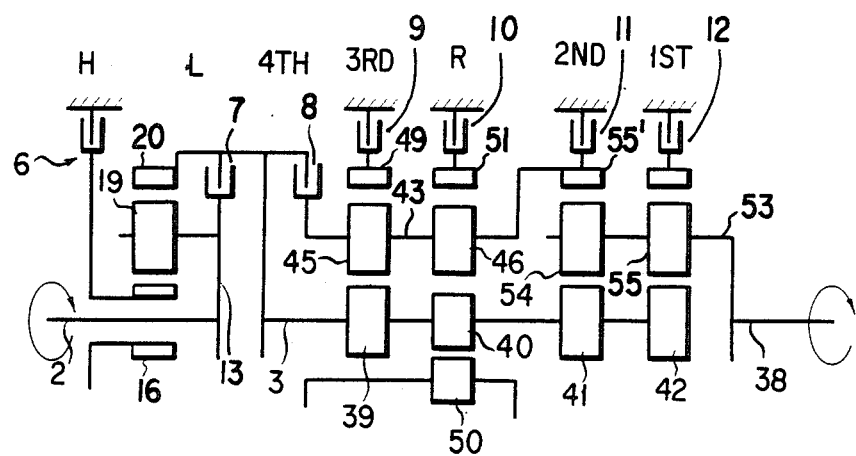
FIG. 1 is a schematic view for explaining a construction of one preferred embodiment of the present invention.
Figure 2:
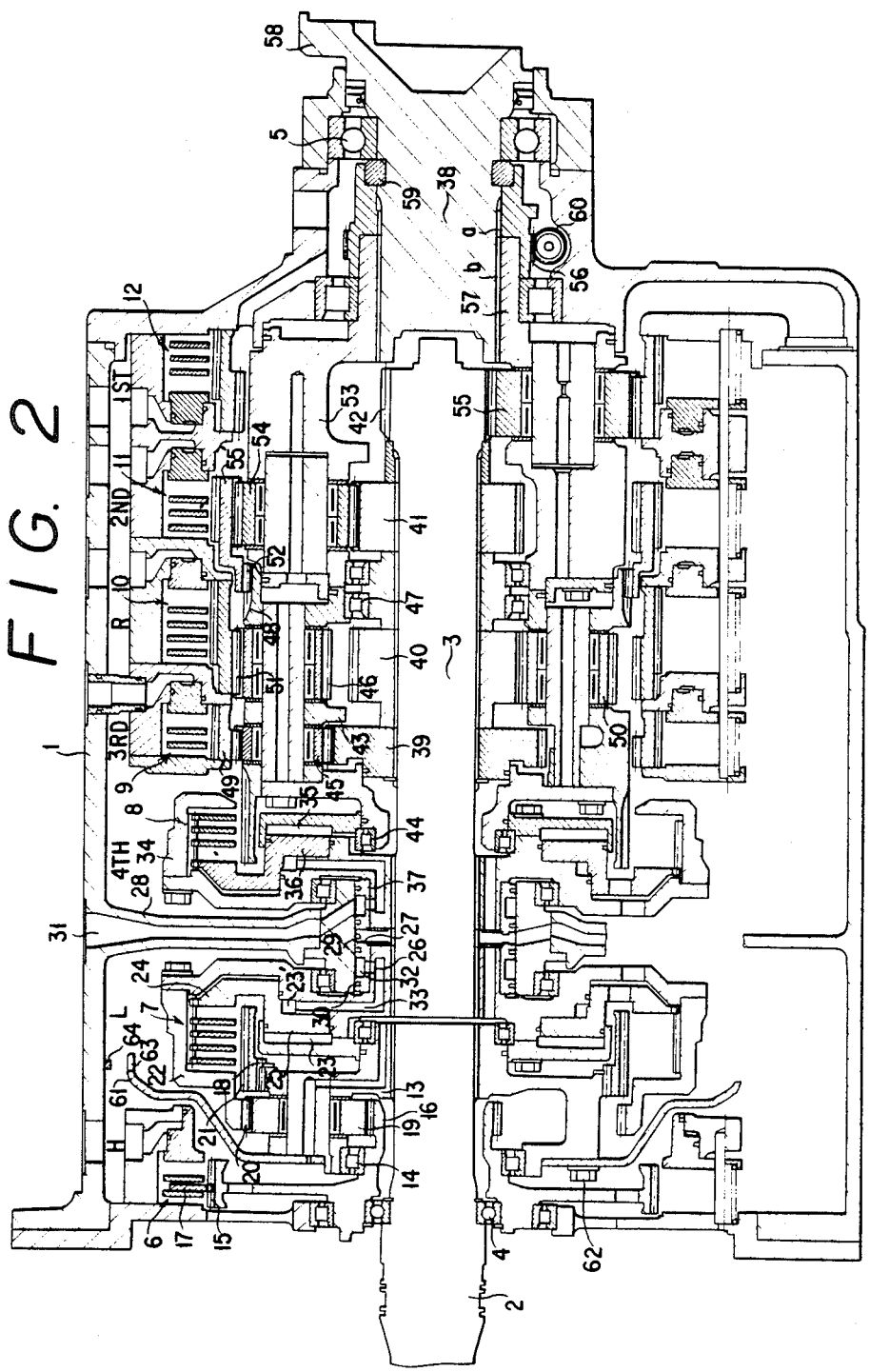
FIG. 2 is a cross-section view for explaining the construction of one preferred embodiment of the present invention.

In the following, the present invention will be explained with reference to the accompanying drawings. A transmission case 1 supports an input shaft 2, an intermediate shaft 3 and an output shaft 38 via bearings 4 and 5 so as to align along a common axis, and within the transmission case 1 are disposed a high speed use fixed clutch 6 in a high speed stage gear train H, a low speed use rotary clutch 7 in a low speed stage gear train L, a rotary clutch 8 in a fourth speed stage gear train 4TH, a fixed clutch 9 in a third speed stage gear train 3RD, a reverse use clutch 10 in a reverse stage gear train R, a fixed clutch 11 in a second speed stage gear train 2ND and a fixed clutch 12 in a first speed stage gear train 1ST.

To the input shaft 2 is fixedly secured a first carrier 13, and also on the input shaft 2 are provided a gear 15 and a first sun gear 16 in the high speed stage gear train H via the bearing 4, the respective gears 15 and 16 being fixedly secured to each other. And the gear 15 meshes with a disc 17 in the high speed use fixed clutch 6.

The first carrier 13 meshes with a ring rear 18 on the inside of an inner drum 21 of the low speed use rotary clutch 7 in the low speed stage gear train L. On the first carrier 13 is pivotably supported a first planetary gear 19, and the first planetary gear 19 meshes with the first sun gear 16 and the first ring rear 20 on the inside of an outer drum 22 of the low speed use rotary clutch 7.

The outer drum 22 of the low speed use rotary clutch 7 is fixedly secured to the intermediate shaft 3, a cylinder portion 23 is formed in this outer drum 22, and within the cylinder portion 23 is fitted a piston 25 adapted to be actuated by a pusher plate 24. Around a boss portion 26 of the outer drum 22 is fixedly fitted a collar 27, and the collar 27 is slidably in contact with a peripheral surface of a hole 29 formed in a partition wall 28 of the transmission case 1 via a rotary seal ring 30. In the partition wall 28 is formed an oil path 31, and the oil path 31 is communicated with an oil chamber 23' in the cylinder portion 23 through an oil path 32 in the collar 27 and an oil path 33 in the outer drum 22.

The rotary clutch 8 in the fourth speed stage gear train 4TH is disposed at a symmetric position to the low speed use rotary clutch 7 with the above-described partition wall 28 placed therebetween, and its component members, that is, an outer drum 34, a cylinder portion 35, a piston 36 and a collar 37 have the same configurations as the corresponding members 22, 23, 25 and 27, respectively, of the low speed use rotary clutch 7.

On the intermediate shaft 3 are disposed second, third, fourth and fifth sun gears 39, 40, 41 and 42, and reference numeral 43 designates a carrier. The carrier 43 is supported from the outer drum 34 of the rotary clutch 8 and the intermediate shaft 3 via bearings 44 and 47, respectively, on the carrier 43 are rotatably supported second, third and fourth planetary gears 45, 46 and 50, and on the carrier 43 is formed a gear 48. The second planetary gear 45 is meshed with the second sun gear 39 and a ring gear 49 in the third speed stage gear train 3RD, the third planetary gear 46 is meshed with a ring gear 51 in the reverse use fixed clutch 10, the fourth planetary gear 50 is meshed with the third sun gear 40, and the gear 48 is meshed with a ring gear 52 of the fixed clutch 11 in the second speed stage gear train 2ND.

To the output shaft 38 is mounted a carrier 53, a fifth planetary gear 54 and a sixth planetary gear 55 are rotatably supported from the carrier 53, the fifth planetary gear 54 is meshed with a ring gear 55' of the fixed clutch 11 in the second speed stage gear train 2ND and the fourth sun gear 41, and the sixth planetary gear 55 is meshed with the fifth sun gear 42.

On the above-mentioned output shaft 38 is disposed a worm gear 56 through spline coupling. This worm gear 56 has two spigots a and b, one spigot a is effective for the output shaft 38, and the other spigot b is effective for a boss portion of the carrier 53.

In addition, an output coupling 58 is formed integrally with the output shaft 38 so that positioning can be achieved by assembling a spacer 59 having a two-section structure.

Reference numeral 60 designates a worm.

A sensing plate 61 is fixedly secured onto an end surface of the first carrier 13 in the above-described high speed stage gear train H by means of bolts 62, a notched part 63 of the outer peripheral portion of this sensing plate 61 are positioned in alignment with the outer circumference of the high speed use fixed clutch 6, and a pick-up 64 opposed to the notched part 63 is inserted into the transmission casing 1 and is mounted on its inner circumferential surface.

Now description will be made of an operation of the above-described transmission system.

In the case of a forward first speed F1, the low speed use rotary clutch 7 is actuated ON, and the fixed clutch 12 in the first speed stage gear train 1ST is actuated ON. A torque of the input shaft 2 is transmitted to the output shaft 38 through the first carrier 13, the low speed use rotary clutch 7, the intermediate shaft 3, the fifth sun gear 42, the sixth planetary gear 55 and the carrier 53.

In the case of a forward second speed F2, the low speed use rotary clutch 7 is actuated ON, and the fixed clutch 11, in the second speed stage gear train 2ND is actuated ON. A torque of the input shaft 2 is transmitted to the output shaft 38 through the first carrier 13, the low speed use rotary clutch 7, the intermediate shaft 3, the fourth sun gear 41, the fifth planetary gear 54 and the carrier 53.

In the case of a forward third speed 3F, the high speed use fixed clutch 6 is actuated ON, and the fixed clutch 11 in the second speed stage gear train 2ND is actuated ON. A torque of the input shaft 2 is transmitted to the output shaft 38 through the first carrier 13, the first planetary gear 19, the outer drum 22 of the low speed use rotary clutch 7, the intermediate shaft 3, the fourth sun gear 41, the fifth planetary gear 54 and the carrier 53.

In the case of a forward fourth speed 4F, the low speed use rotary clutch 7 is actuated ON, and the fixed clutch 9 in the third speed stage gear train 3RD is actuated ON. A torque of the input shaft 2 is transmitted to the output shaft 38 through the first carrier 13, the low speed use rotary clutch 7, the intermediate shaft 3, the second sun gear 39, the second planetary gear 45, the carrier 43, the gear 48, the ring gear 55', the fifth planetary gear 54 and the carrier 53.

In the case of a forward fifth speed 5F, the high speed use fixed clutch 6 is actuated ON, and the fixed clutch 9 in the third speed stage gear train 3RD is actuated ON. A torque of the input shaft 2 is transmitted to the output shaft 38 through the first carrier 13, the first planetary gear 19, the outer drum 22 of the low speed use rotary clutch 7, the intermediate shaft 3, the second sun gear 39, the second planetary gear 45, the carrier 43, the gear 48, the ring gears 52 and 55', the fifth planetary gear 54 and the carrier 53.

In the case of a forward sixth speed 6F, the low speed use rotary clutch 7 is actuated ON, and the rotary clutch 8 in the fourth speed stage gear train 4TH is actuated ON. A torque of the input shaft 2 is transmitted to the output shaft 38 through the first carrier 13, the low speed use rotary clutch 7, the rotary clutch 8 and the carriers 43 and 53.

In the case of a forward seventh speed 7F, the high speed use fixed clutch 6 is actuated ON, and the rotary clutch 8 is actuated ON. A torque of the input shaft 2 is transmitted to the output shaft 38 through the first carrier 13, the first planetary gear 19, the outer drum 22 of the low speed use rotary clutch 7, the intermediate shaft 3, the rotary clutch 8 and the carriers 43 and 53.

Finally, in the case of a rearward first speed R1, the low speed use rotary clutch 7 is actuated ON, and the reverse use rotary clutch 10 is actuated ON. Consequently, a torque of the input shaft 2 is transmitted to the output shaft 38 through the first carrier 13, the low speed use rotaty clutch 7, the intermediate shaft 3, the third sun gear 40, the fourth planetary gear 50 and the carriers 43 and 53.

Figure 3:
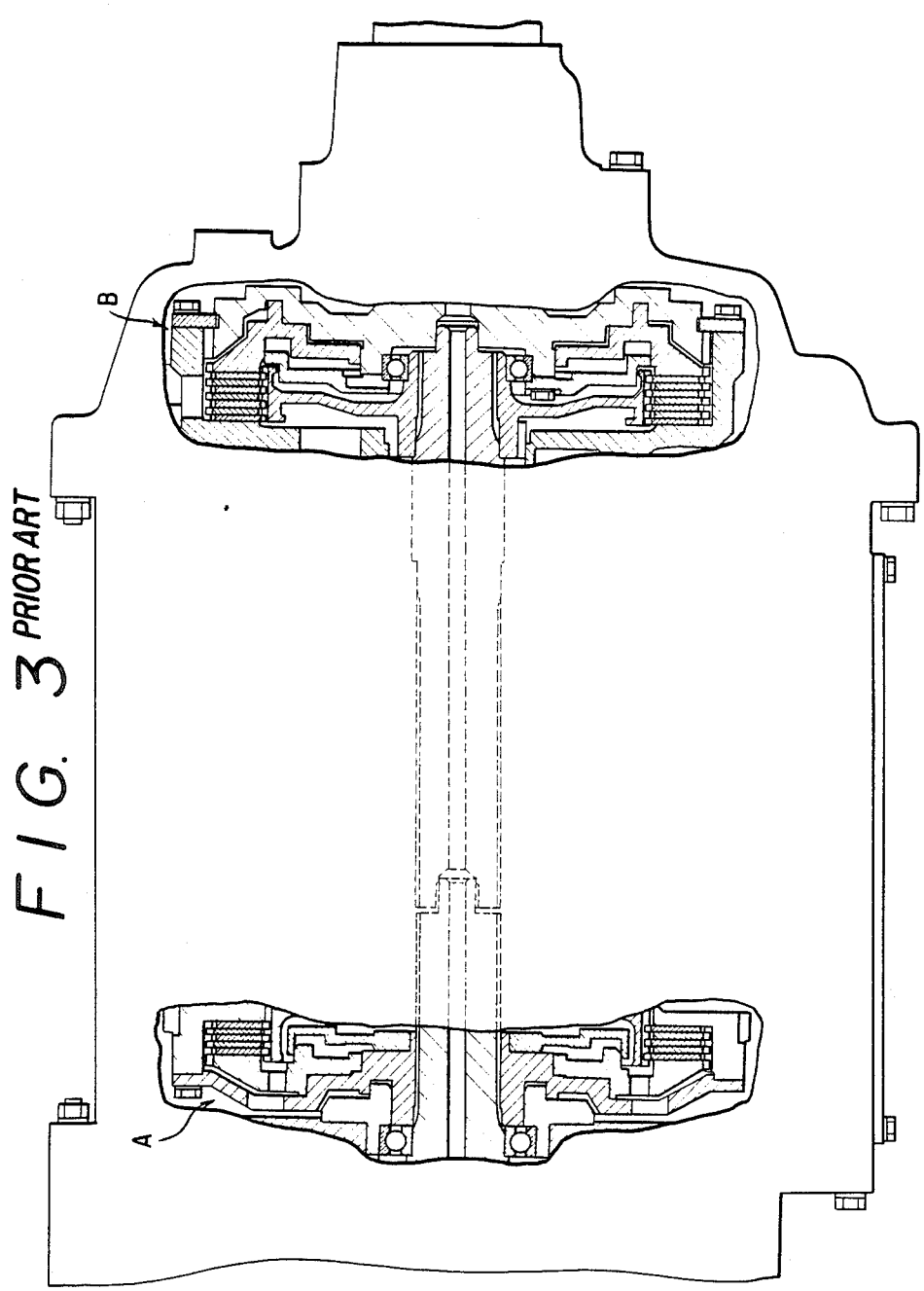
FIG. 3 is a partial cross-section view showing an arrangement of clutches in a planetary gear type transmission system in the prior art.

A transmission system having many speed stages for use in a dump truck or the like is generally constructed by making use of two rotary clutches of the direct coupling type. In many cases, heretofore, these two rotary clutches A and B were disposed apart from each other as shown in FIG. 3, and consequently, with respect to the individual component parts thereof also, they were not common between the respective rotary clutches A and B, so that the number of parts was very large. In addition, as shown in FIG. 3 the rotary clutches A and B were disposed at the most remote positions from a control valve, hence piping resistance of a clutch circuit was large, resulting in elongation of filling time, and therefore, the performance was inferior.

In this respect, in the transmission system according to the present invention, owing to the fact that the low speed use rotary clutch 7 and the rotary clutch 8 are constructed to have the same structure and disposed in back-to-back relationship with the partition wall 28 placed therebetween, the above-described disadvantages are eliminated.

Figure 4:
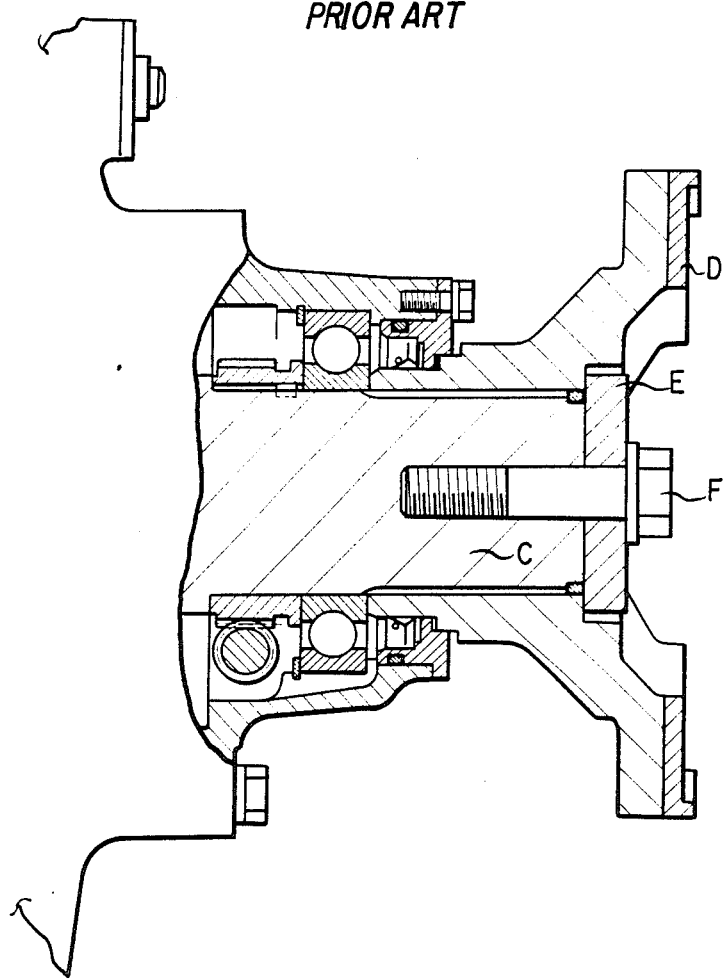
FIG. 4 is a longitudinal cross-section view of an output shaft portion in a planetary gear type transmission system in the prior art.

Moreover, the construction of the output coupling section in the transmission system in the prior art was such that an output shaft C and a coupling D were separated from each other and they were fastened together by means of a holder E and a bolt F as shown in FIG. 4, hence the structure was complex, the number of parts was large, and portions to be machined were great many, so that the transmission system was of high cost.

In this respect, in the transmission system according to the present invention, since the output shaft 38 and the output coupling 58 are integrally formed and a two-section type spacer 59 is assembled therein so as to make positioning possible, and also, since a centering function with respect to the transmission case 1 can be achieved by means of the spigots a and b, the aforementioned disadvantages can be obviated.

Figure 5:
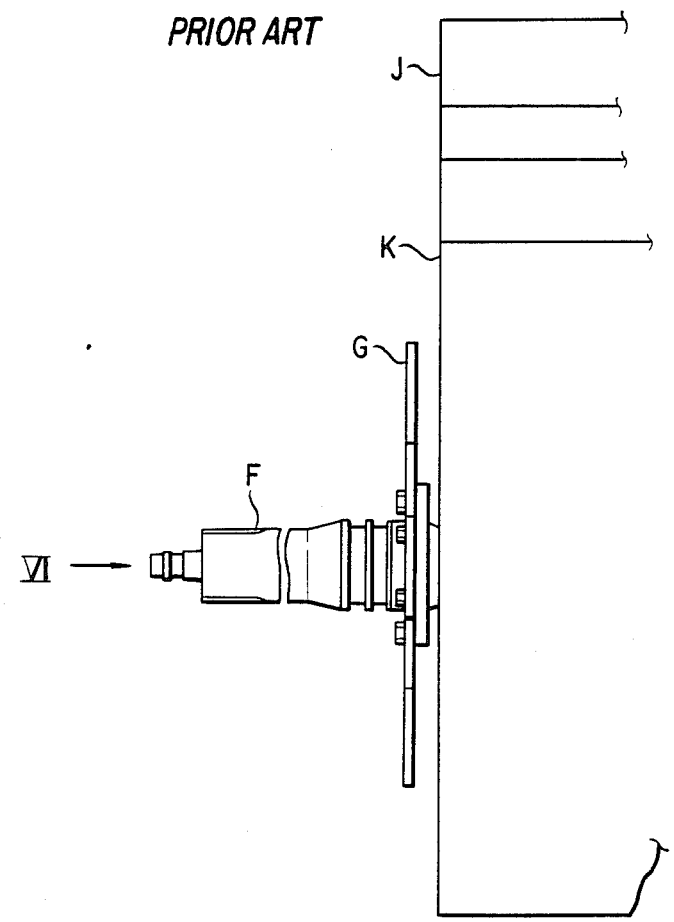
FIG. 5 is a side view of input rotation detector means in a planetary gear type transmission system in the prior art.
Figure 6:
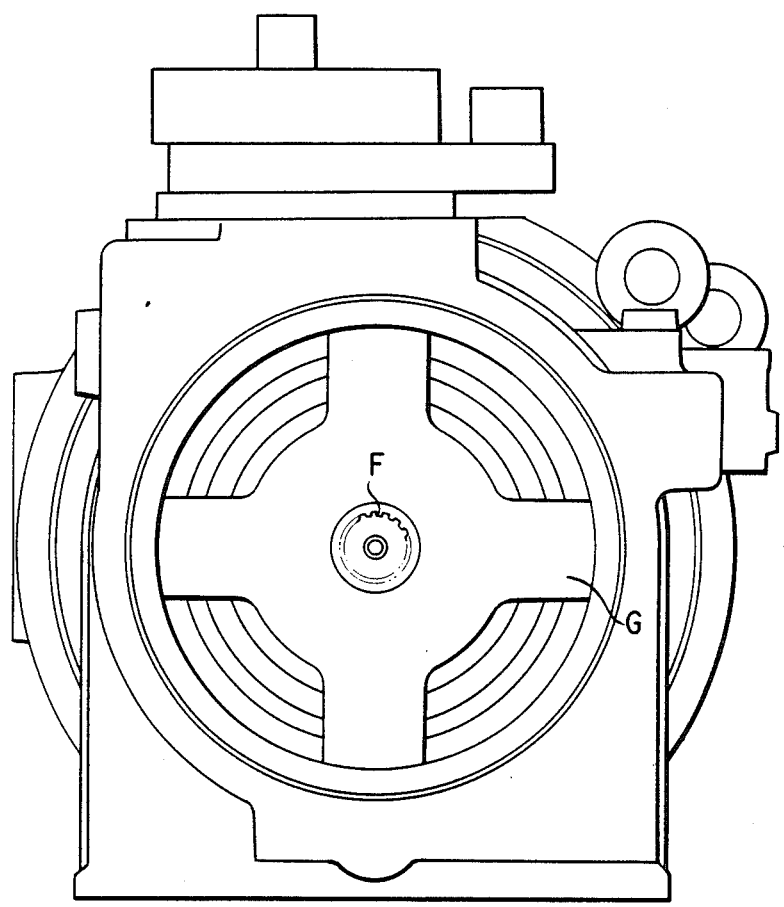
FIG. 6 is an end view of the detector means in FIG. 5 as view in the direction of arrow VI.
Figure 7:
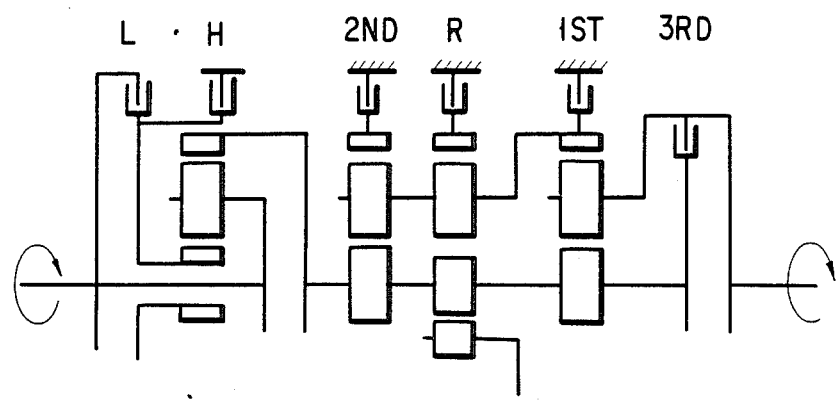
FIG. 7 is a schematic view for explaining a construction of a planetary gear type transmission system in the prior art.

In addition, in a transmission system in the prior art, in some cases input rotation was detected and used as one of the automatic speed change signals, and in such cases often a sensing plate G was disposed on an input shaft F as shown in FIG. 5. However, in this case, the sensing plate G was positioned away from an adjacent surface K of a transmission case J, hence an input-output mounting length in a torque converter transmission assembly was elongated by the length corresponding to that space, and also the weight of the transmission system became heavier.

In this respect, in the transmission system according to the present invention, owing to the fact that the sensing plate 61 is mounted to the carrier 13 of the high speed stage gear drain H, provision is made such that detection of input rotation is possible and yet a specially reserved space is not necessitated.

As described in detail above, according to the present invention, owing to the fact that the high speed stage gear train H is disposed on the input side of the low speed stage gear train L, the low speed use rotary clutch 7 in the low speed stage gear train L is constructed so as to directly couple the ring gear 20 in the high speed stage gear train H with the carrier 13 in the high speed stage gear train H, the first speed stage gear train 1ST is disposed on the output side of the second speed stage gear train 2ND, the carrier 53 in the first speed stage gear train 1ST is coupled to the output shaft 38, and the fourth speed stage gear train 4TH, third speed stage gear train 3RD and reverse stage gear train R are disposed between the low speed stage gear train L and the second speed stage gear train 2ND; in contrast to that heretofore when a low speed use rotary clutch in the low speed stage gear train L was ON, the input shaft made torque circulation and hence a shaft stress was large, such phenomena do not occur, the torque circulation is eliminated, and the shaft stress can be made low. In addition, with regard to the stage ratio between the speed stages, an equal stage ratio of about 1.35 which is close to an ideal value can be provided, a high reliability associated with little torque and rotation change can be realized owing to an internal behavior, and also the system becomes compact.

What is claimed is:

1. A planetary gear type transmission system comprising:

a high speed stage gear train (H) disposed on an input side of a low speed stage gear train (L), a low speed use first rotary clutch (7) in said low speed stage gear train (L) constructed so as to directly couple a ring gear (20) in said high speed stage gear train (H) with a carrier (13) in the high speed stage gear train (H), power being input through said carrier (13) to said low speed stage gear train (L) at a 1:1 ratio when said first rotary clutch (7) is engaged and being input to said high speed stage gear train (H) by said carrier (13) and output therefrom by said ring gear (20) when said first rotary clutch (7) is disengaged, a first speed stage gear train (1ST) disposed on an output side of a second speed stage gear train (2ND), a first carrier (53) in said first speed stage gear train (1ST) and a third carrier in said second speed stage gear train (2ND) being coupled to an output shaft (38), and a fourth speed stage gear train (4TH) having the same rotation rate as said high speed stage gear train (H) and said low speed stage gear train (L), a third speed stage gear train (3RD) and a reverse stage gear train (R) being disposed between the low speed stage gear train (L) and the second speed stage gear train (2ND), said fourth speed stage gear train, said third speed stage gear train and reverse stage gear train being directly connected to each other and commonly including a second carrier (43) and a second rotary clutch (8), said first and second rotary clutches being disposed on an intermediate shaft (3) adjacent to each other between said high speed stage gear train (H) and said fourth speed stage gear train (4TH), said intermediate shaft (3) also carrying sun gears of said first (1ST), second (2ND), third (3RD) and reverse (R) speed stage gear trains.

* * * * *